United States Patent [19]

Howard et al.

[11] 4,344,247
[45] Aug. 17, 1982

[54] OTTERBOARD

[75] Inventors: Benedick J. Howard, Toronto; Emil Lill, Mississauga, both of Canada

[73] Assignee: Kennametal Inc., Latrobe, Pa.

[21] Appl. No.: 819,393

[22] Filed: Jul. 27, 1977

[51] Int. Cl.³ .......................................... A01K 73/045
[52] U.S. Cl. ........................................ 43/9; 114/245
[58] Field of Search .............. 114/242, 244, 245; 228/122; 43/9; 29/526; 219/69 E; 188/251 M; 172/767

[56] References Cited

U.S. PATENT DOCUMENTS

| 2,217,001 | 10/1940 | Bockius et al. | 188/251 M X |
| 3,529,677 | 9/1970 | Stephenson | 172/767 |
| 3,585,342 | 6/1971 | Kosco | 219/69 E |
| 3,774,334 | 11/1973 | Giovanni | 43/9 |
| 3,882,594 | 5/1975 | Jackson et al. | 228/122 |

FOREIGN PATENT DOCUMENTS

| 1311115 | 12/1962 | France | 43/9 |
| 772885 | 4/1957 | United Kingdom | 43/9 |

*Primary Examiner*—Sherman D. Basinger
*Attorney, Agent, or Firm*—Lawrence R. Burns

[57] ABSTRACT

An otterboard and a method of manufacturing an otterboard are disclosed wherein the otterboard is comprised of a plate member, a shoe member and a sole plate. The shoe member is formed of a tough wear resistant material and attached to a bottom side of the plate member. The sole plate is made of a hardenable steel and has a bottom side with grooves formed therein for receiving inserts of a hard wear resistant material. The method of manufacturing the otterboard includes the step of electro-discharge machining the shoe member so that the sole plate may be connected to the shoe member.

7 Claims, 5 Drawing Figures

OTTERBOARD

BACKGROUND OF THE INVENTION

The present invention deals with otterboards which are used in trawling operations.

Otterboards serve two main purposes, they keep the nets on the bottom of the sea bed and they are kept skewed slightly outwardly as they are towed so as to keep the net open when trawling. Typically, otterboards weigh about 1400 to 1500 pounds and a "channel shoe" up to approximately nine inches thick is welded to the bottom portion of the otterboard.

The channel shoe is usually made from a tough manganese type steel so as to withstand the abrasive sea bottom encountered when trawling.

BRIEF SUMMARY OF THE INVENTION

According to the present invention, a more wear resistant otterboard is proposed and comprises a plate member adapted on one end for connection to a net and also adapted to be connected to a tow line so as to be towed through the water.

On the bottom portion of the plate member, an elongate shoe member is releasably attached and is comprised of a tough wear resistant material, preferably, an austenitic manganese steel. On a bottom side of the shoe member, a sole plate is releasably attached and is, preferably, comprised of a hardenable machinable steel strip with grooves formed in its bottom side. Inserts of a hard wear resistant material, preferably, a cemented hard metal carbide, such as tungsten carbide, are placed in said grooves and fixedly held therein such as by brazing.

The sole plate is preferably constructed having two grooves formed along the longitudinal outer edges of the bottom side of the plate. Plow bolts are used for releasably attaching the sole plate to the shoe member and extend upward through the middle of the sole plate. The sole plate may also be welded to the bottom of the shoe member.

The preferable method of construction of the otterboard involves electro-discharge machining vertical holes in the shoe member to allow the plow bolts to be bolted on a lap portion of the shoe member.

It is an object of the present invention to provide longer lasting, more wear resistant construction of an otterboard.

It is a further object of the present invention to provide easily replaceable wear parts to simplify repair and refurbishment of otterboards.

The exact nature of the present invention will become more clearly apparent upon reference to the following detailed specification taken in connection with the accompanying drawings in which.

DETAILED DESCRIPTION OF THE INVENTION

Figure 1:
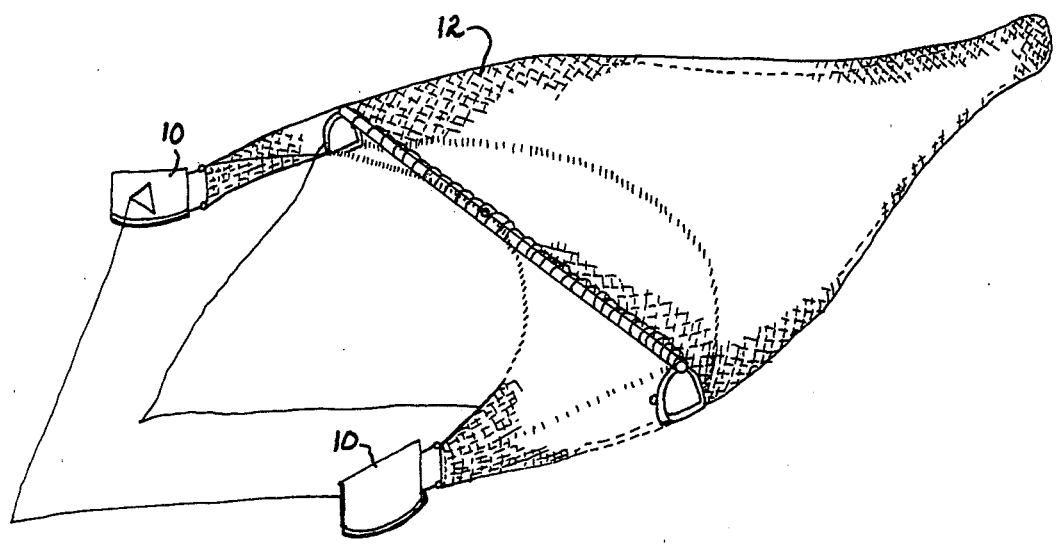
FIG. 1 is a perspective view of an otterboard being used in its natural environment.

Referring to the drawings somewhat more in detail, shown in FIG. 1 are otterboards 10 shown towing a net 12 in a conventional manner. The otterboards 10 serve two purposes. First, the otterboards typically weigh between 1400 to 1500 pounds and are used to keep the nets on the floor of the sea bed and, secondly, the otterboards are skewed at an angle of about 36 degrees to the direction of travel so that they hold the net 12 open while trawling.

Figure 2:
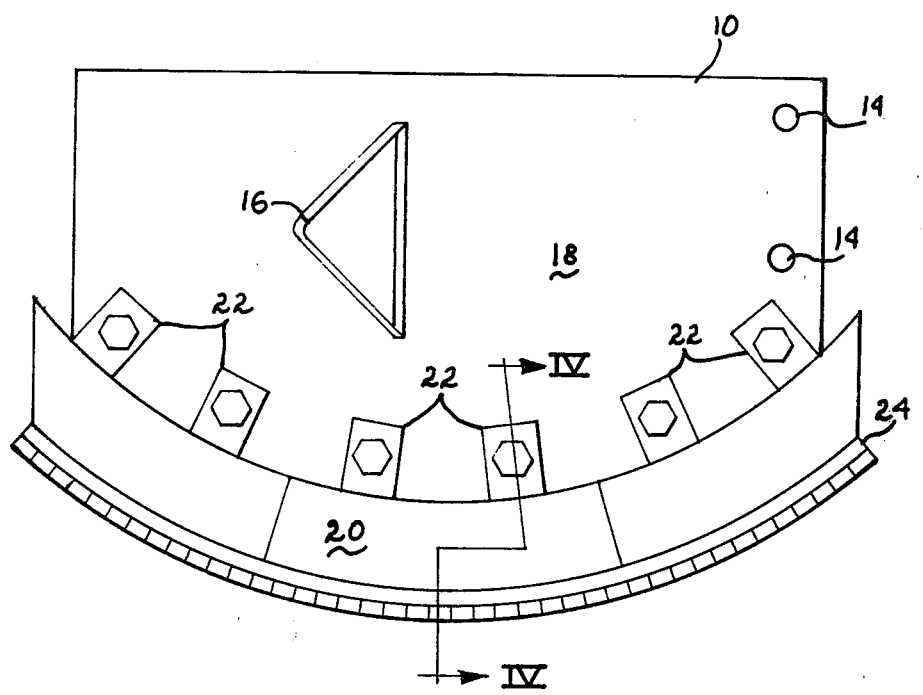
FIG. 2 is a side view of an otterboard according to the present invention.

Referring to FIG. 2, what is shown therein is an otterboard 10 having connections 14 thereon for connecting net 12 to the otterboard. Connection bracket 16 is provided on otterboard 10 so that a tow line may be attached thereto to pull the otterboard through the water.

Otterboard 10 is shown in FIG. 2 as comprising an upper plate member 18 and having attached along a bottom portion of plate member 18 a shoe member 20. Shoe member 20 is releasably attached by lugs 22 to plate member 18 and is preferably formed from a tough wear resistant material such as a manganese steel material.

Attached along the bottom surface of the shoe member 20 is a sole plate member 24. The sole plate member 24 is releasably attached such as by bolt means so that it may be easily removed and replaced when necessary.

Figure 3:
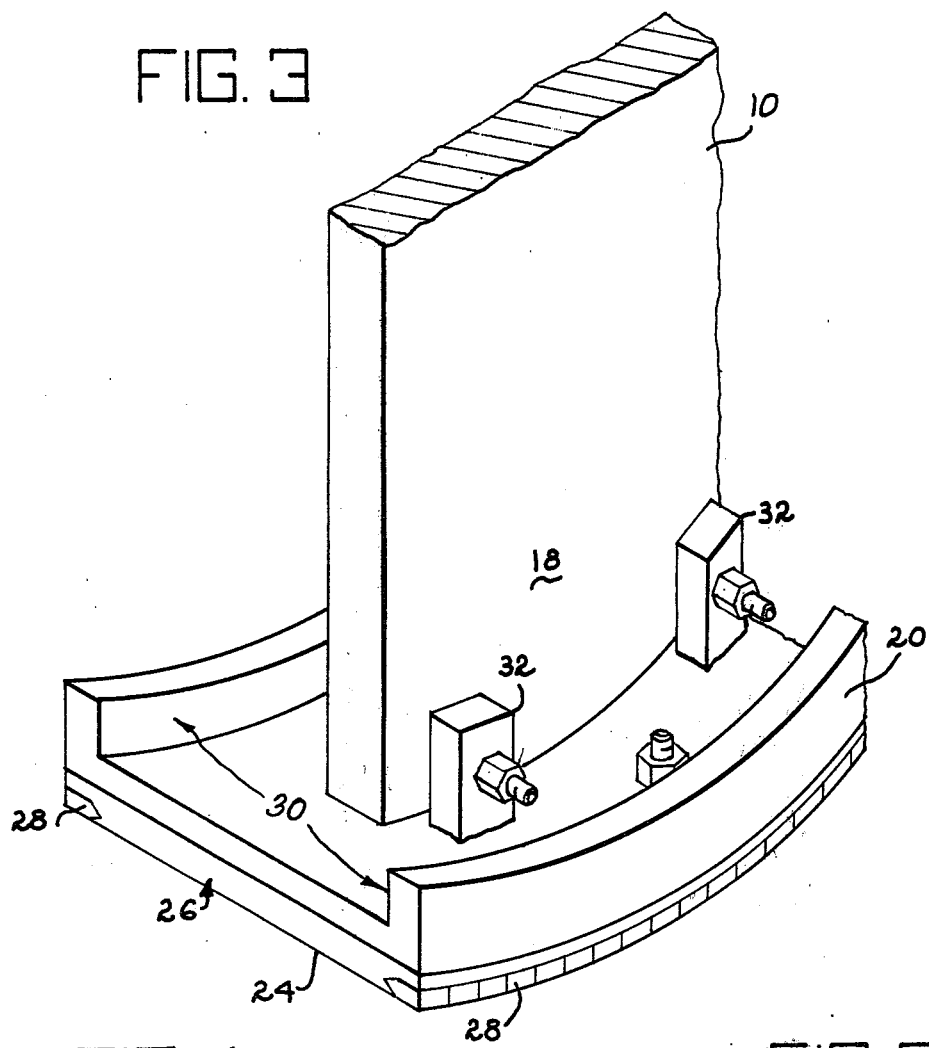
FIG. 3 is a perspective view of a front edge of an otterboard according to the present invention.

Referring now to FIG. 3, shown therein is the plate member 18 having shoe member 20 attached thereto and having the sole plate 24 fastened along the bottom of the shoe member 20. Plate member 24 is preferably comprised of a hardenable steel material 26 having grooves formed along bottom side thereof with inserts 28 mounted in the grooves.

Inserts 28 are preferably made from a hard wear resistant material such as a cemented hard metal carbide material. The longitudinal grooves in the bottom part of sole plate 24 are preferably formed along the longitudinal outer edges, although there could be more than two rows of grooves formed in the sole plate 24.

Shoe member 20 is shown having a recess 30 formed along its upper surface which receives lower edge of plate member 18. Lug members 32, upstanding from the shoe member 20, are used to releasably attach shoe member 20 to plate member 18.

Figure 4:
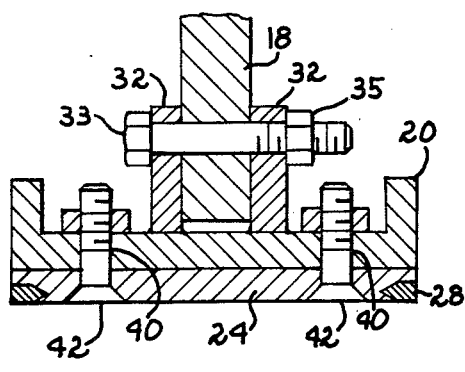
FIG. 4 is a view through IV—IV of FIG. 2.

Referring now to FIG. 4, what is shown therein is the lower part of plate member 18 as it joins upstanding lugs 32 on shoe member 20. Shoe member 20, formed of a manganese steel material, is U-shaped in configuration having a recess 30 formed along the upper portion of the shoe member 20. Lugs 32 are bolted and held to plate member 18 by bolts 33 and nuts 35 at spaced intervals along the center line of the shoe member 20. Sole plate 24 is shown having log cabin type inserts 28 placed in the longitudinal grooves formed at the outer edges of sole plate 24.

Holes 40 are then machined in shoe member 20 using electro-discharge machining techniques so that bolts 42 may extend upwardly through shoe member 20 so as to hold the sole plate on the lower part of shoe member 20. Sole plate 24 may also be welded along its inner face with shoe member 20 in order to hold it in place on the bottom portion of shoe member 20.

Both the sole plate 24 and the shoe member 20 may be formed of the same material or shoe member 20 may be formed of the manganese steel material and the sole plate 24 is preferably formed of a machinable type material having carbide inserts 28 protecting parent material along its outer edges.

Figure 5:
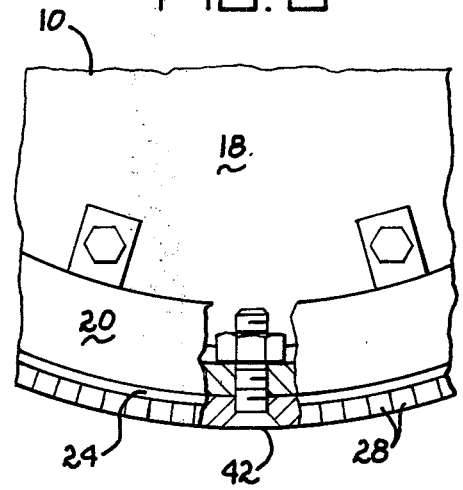
FIG. 5 is a view along a portion of the longitudinal center line of the otterboard according to the present invention.

Shown in FIG. 5 is the lower part of otterboard 10 having plate member 18 joined with shoe plate 20 and the sole plate 24. Bolt 42 is shown holding the sole plate to the shoe member. As can be seen in FIG. 5, both the shoe member and sole plate are formed having the curved configuration which may be described from a side view being concave facing upwardly from the bottom of the sole plate.

It is preferable that the sole plate member 24 is curved so as to fit in as much a line to line contact as possible along the bottom part of shoe member 20.

Carbide inserts 28 are segmented along the outer edges of the sole plate 24 and are held in their grooves as by brazing and other well known techniques.

Modifications may be made within the scope of the appended claims.

What is claimed is:

1. An otterboard for use in trawling and comprising; a plate member with means thereon for connecting to a trawling net and also having means for connection to a tow line so as to be towed through the water, a shoe member comprised of an austenitic manganese wear resistant steel material and releasably attached to a bottom side of said plate member, and a substantially rectangular steel sole plate having a bottom side with longitudinal grooves formed therein and segmented inserts comprised of cemented hard metal carbide material held in said grooves.

2. An otterboard according to claim 1 in which said rectangular piece of steel is comprised of a hardenable steel material.

3. An otterboard according to claim 2 which further comprises bolt means releasably connecting said sole plate to said shoe member, said bolt means extending through holes formed in said shoe member.

4. The method of making an otterboard comprising the steps of forming an elongate shoe member out of a tough wear resistant austenitic manganese steel, electrodischarge machining bolt holes through said shoe material, grooving the bottom of a sole plate and placing segmented inserts comprised of cemented hard metal carbide material in the grooves and bolting said sole plate to said shoe member, and releasably attaching said shoe member and sole plate to the bottom of a plate member forming the main part of the otterboard.

5. The method according to claim 4 which further includes making the sole plate by grooving a bottom side of a piece of hardenable machinable steel and placing hard wear resistant inserts in the grooves.

6. The method according to claim 5 which further includes placing the grooves along the longitudinal outer edges of the piece of hardenable machinable steel.

7. The method according to claim 5 which further includes brazing said inserts in said groove.

* * * * *